3,475,686
METHOD AND APPARATUS FOR SELECTION OF ANTENNA PROVIDING ACCEPTABLE SIGNAL
Arthur P. Holt, Jr., Marietta, and Edward N. Lide, Atlanta, Ga., assignors to Lockheed Aircraft Corporation, Burbank, Calif.
Filed May 17, 1966, Ser. No. 550,865
Int. Cl. H04b 1/06
U.S. Cl. 325—304                            8 Claims

ABSTRACT OF THE DISCLOSURE

Antenna selection method and apparatus for determining the one of a plurality of available antennas which provides an acceptable received signal and for connecting that antenna to receiving and/or transmitting equipment. The apparatus alternately connects the available antennas to one or more receivers until a receiver-derived signal exceeds a predetermined threshold level, whereafter the antenna providing such signal is maintained in connection to the receiver or receivers. If the receiver-derived signal falls below the threshold level, the apparatus again alternately connects the available antennas. If a transmitter is operated with the available antennas, the switching apparatus connects the transmitter to the antenna last providing a received signal of at least threshold level. Two parameters of a signal from a single receiver may be applied to the threshold to determine the antenna providing the parameter having the greater amplitude and thus the best usable signal.

---

Figure 1:
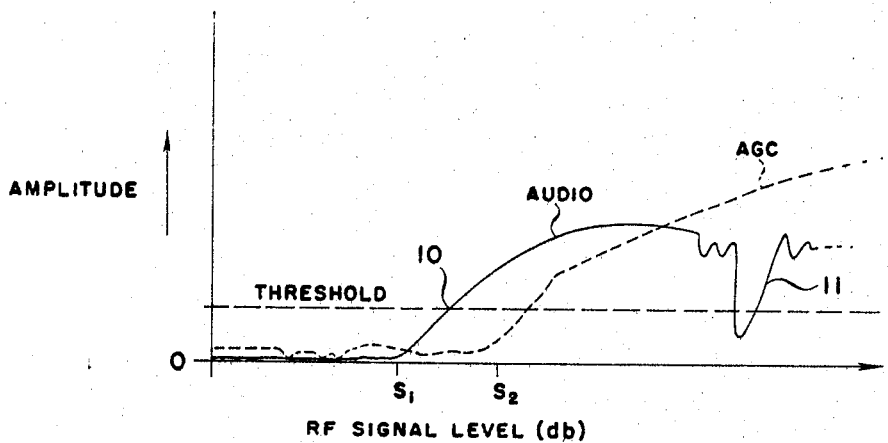

This invention relates in general to a method and apparatus for antenna selection and in particular to a method and apparatus for automatically selecting from an available plurality of antennas that one which provides acceptable reception or produces an acceptable signal in a receiver.

A radio receiver, no matter how sensitive, must be supplied with a certain minimum level of signal before the receiver can produce a useable output. Although the design parameters of an antenna for use with a receiver may be optimized, it nevertheless frequently is difficult or impossible to position this antenna in a location where the field strength of the signal being received is maximized. For example, communications equipment as used on aircraft may utilize an antenna so situated on the exterior of the aircraft that the antenna is partially or completely blocked from the source of signals being received when the aircraft is oriented in a certain way relative to the signal source. While changing the location or orientation of the aircraft may overcome this temporary absence of proper signal strength, such a maneuver may be inappropriate or highly undesirable in view of a particular aircraft situation. Moreover, the received signal may be lost at the very time that signal reception is most important. Antennas situated in fixed locations also may be subjected to intermittent local variations in signal intensity, an occurrence which may be caused by temporary propagation fluctuations or by the passage of aircraft adjacent the transmitting or receiving locations.

It has been proposed in the prior art to provide a plurality of antennas for a receiver subject to the foregoing problem, and to provide an appropriate switching apparatus so that the antenna providing the best signal can be connected to the receiver. It also is known to the prior art to provide automatic switching apparatus so that that one of the available plurality of antennas providing the best signal strength is automatically connected to the receiver; however, it has been found that this technique does not always cause connection to the receiver of the antenna producing the best useable signal output. More particularly, in certain types of receivers wherein modulation, for example, of a fixed frequency is received and utilized, the level of the carrier signal being received is not always the best indication of the most useable output signal of the receiver. This characteristic is found, for example, in Tacan receivers. Furthermore, switching apparatus of the prior art utilized numerous electromechanical relays and other components having weight and reliability considerations not favorable for airborne applications.

In receiver systems utilizing multiple antennas and having more than one receiver which is to be connected to that one of the multiple antennas producing the best signal, there is also the problem of providing suitable automatic antenna selection apparatus which performs this switching function. Such apparatus ideally should select and hold the antenna producing an acceptable signal in any of the receivers.

According to the present invention, there has been disclosed an antenna selection technique wherein both the carrier signal strength and the level of the audio signal present in a receiver such as used with a Tacan system are used to determine antenna selection. This invention also sets forth improved antenna selection apparatus for use with the foregoing technique or with other antenna selection applications.

Accordingly, it is an object of this invention to provide an improved method for antenna selection.

It is another object of this invention to provide an improved antenna selection method for automatically selecting from a plurality of antennas any antenna which provides a useable output signal from a receiver.

A further object of this invention is to provide an antenna selection method enabling automatic selection from a plurality of antennas of that antenna which produces the best signal at any of a plurality of receivers.

Yet another object of this invention is to provide an antenna selection method for causing selection from a plurality of antennas of any antenna which provides a useable receiver output signal at extremes of carrier signal field strength.

Still another object of this invention is to provide improved antenna selection apparatus.

Yet another object of this invention is to provide antenna selection apparatus which permits automatic selection from an available plurality of antennas of that antenna providing a useable output signal from a receiver.

A still further object of this invention is to provide antenna selection apparatus which enables automatic selection from an available plurality of antennas in response to the best signal from any of a plurality of receivers.

Figure 2:
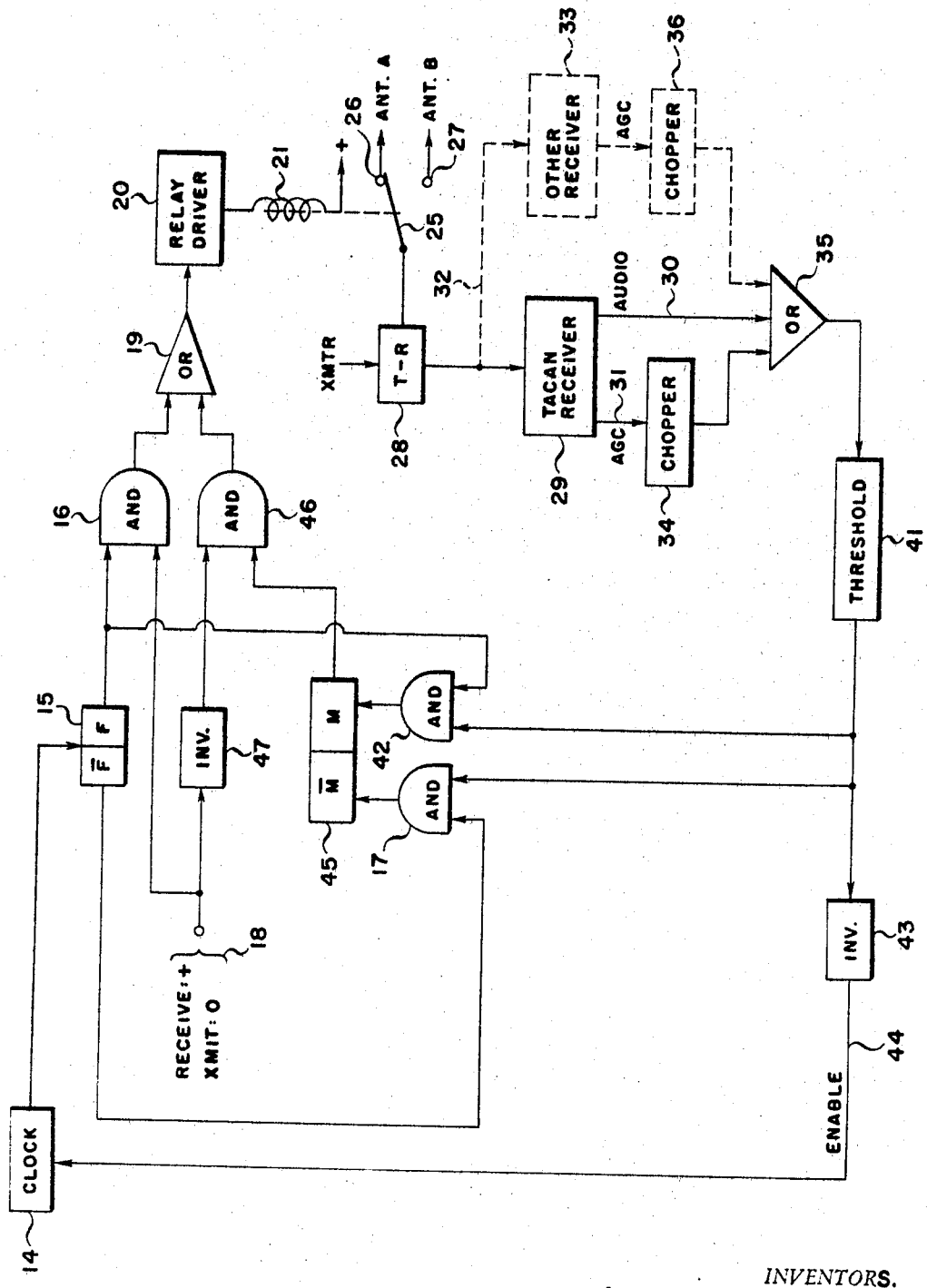

The exact nature of this invention as well as other objects and advantages thereof will be readily apparent from consideration of the following specification relating to the annexed drawings in which:

FIGURE 1 is a graphical representation of signals used in an embodiment of the method of this invention; and FIGURE 2 is a schematic view of apparatus according to an embodiment of this invention.

Stated generally, it has been learned that in at least some receivers of the type receiving a carrier signal on which is impressed a steady state modulation signal, the strength of the carrier signal being received, as measured by the AGC signal produced by the receiver, may not at low carrier signal levels be a good indicator of a received signal capable of producing useable receiver output. To the contrary, the level of the modulation signal contained on the carrier has been found to provide a more dependable measure of useable receiver output at relatively low levels to provide a more dependable measure of useable receiver output at relatively low levels of carrier signal. However, at some levels of received signal strength, the modulation signal sometimes is subjected to amplitude fluctuations not present in the carrier signal and believed to result from temporary propagation disturbances such as selective fading or the like. Accordingly, an embodiment of the method of this invention lies in the use of the carrier signal strength and the modulation signal strength to control antenna switching.

According to the apparatus shown in this embodiment of the invention, an antenna switch is provided which selects among available antennas under the control of a suitable switching signal. When the receiver or receivers to which the selected antenna is connected produce an output at least of a certain threshold level, the antenna selector switch holds on the antenna which produced that signal and this holding action continues until such time that the received signal at that antenna drops below the threshold level. When that happens, the antenna switch once again comes under the control of the switching signal. Additional circuitry ensures that the particular antenna which last produced a received signal of threshold level is used for transmitting and prevents antenna switching during transmitting.

With particular reference taken to FIGURE 1 of the drawing there is shown in graphical form a representation of the relative levels of intensity of the AGC signal and the audio output of a receiver with respect to the intensity of the RF signal applied to this receiver. Although this graph is taken with respect to a Tacan receiver wherein the received audio signal is 135 c.p.s., it is to be understood that this is by way of example only and that the method and apparatus described herein is not intended to be limited to use with such a receiver or to Tacan receivers generally. As shown at FIGURE 1, the amplitude of both the audio output and the AGC signal is at or near a zero or reference level with an RF signal level below $s_1$. When a signal level of $s_1$ is reached, however, the audio signal commences to increase until it crosses at point 10 the threshold required for locking of the antenna selection apparatus onto the antenna providing this level of audio signal strength. As can be seen, an RF signal level which yields an audio signal of sufficient amplitude to produce locking does not necessarily produce an AGC signal of threshold intensity. In the example shown, the AGC signal does not commence to increase substantially until the RF signal level reaches $s_2$.

As the received signal level increases, the amplitude of the audio output also increases in a manner which is not necessarily linear. At some RF signal levels, however, the audio output signal may undergo severe amplitude fluctuations as indicated by 11. These fluctuations 11 may result from propagation characteristics such as selective fading or from other phenomena and frequently are of relatively short duration. However, it can be seen that these fluctuations may cause the audio signal to fall below the threshold level, a fact which would result in unlocking of the antenna selection apparatus notwithstanding that the RF signal actually is relatively high. This is overcome according to the present invention by the technique of causing antenna lock-in responsive to the presence of either of the audio or AGC signals being above the threshold level. Once antenna lock-in has occurred, an unlocked condition cannot occur unless both the audio and the AGC signal levels drop below the threshold level at the same time.

Turning now to the apparatus of this invention, an embodiment of which is depicted in FIGURE 2, there is shown a source 14 of clock pulses connected to drive flip-flop 15. As is customary in the art, flip-flop 15 is a bistable device which alternates between a first state F and a second state $\overline{F}$ in response to trigger pulses from clock 14. The F output of flip-flop 15 is connected to AND gate 16, while the $\overline{F}$ output of the flip-flop is connected to AND gate 17. AND gate 16 is supplied with another input from a signal source 18 which presents a positive signal during receive conditions and no signal during transmit conditions.

The output from AND gate 16 is connected to OR gate 19 and the output of this OR gate is applied to relay driver 20 to provide the control function necessary to operate relay 21. Relay 21 actuates switch element 25, which is shown in the position associated with a normally de-energized relay 21 and which selectively connects either of terminals 26 and 27, associated with a first antenna and a second antenna, to a suitable transmit-receive switch 28. This transmit-receive switch 28 may be of conventional construction and performs the customary function of connecting the antenna selected by switch element 25 to a receiver or receivers during receive conditions and to a transmitter during transmit conditions.

The receive side of transmit-receive switch 28 is connected to a suitable receiver 29, which may be a Tacan receiver as described above having an audio output 30 and an AGC output 31. As set forth more fully below, the receive output from the transmit-receive switch also may be connected through line 32 to one or more other receivers 33 which need not function for the same purpose as receiver 29.

The audio output 30 and the AGC output 31, as suitably chopped by chopper 34 to provide an AC signal from the DC AGC signal, are supplied as inputs to OR gate 35. The AGC outputs of any other receivers 33 are also supplied as an additional input to OR gate 35 after passing through suitable additional choppers 36. OR gate 35 is of the type which not only produces an output signal in response to the presence of a signal at any one of the inputs thereof but which also produces an output signal having a magnitude which is a function of the magnitude of the strongest of the input signals to the OR gate. This output signal is applied to threshold 41.

Threshold 41 produces an output pulse only if the input thereto exceeds a certain predetermined level, as indicated on FIGURE 1, and this output pulse from the threshold is supplied as an input pulse to AND gates 17 and 42 and also to pulse inverter 43. The output from inverter 43 is supplied through line 44 as an "enable" control to clock 14, so that clock 14 functions to provide output clock pulses only in the presence of an "enable" signal on line 44. This signal is present from the output of pulse inverter 43 only in the absence of an output pulse from threshold 41.

The outputs of AND gates 17 and 42 each are connected to flip-flop 45. This flip-flop is a bistable device capable of a first output condition M and a second output condition $\overline{M}$, with the M output occurring only in response to an output from AND gate 42 and the $\overline{M}$ output occurring only in response to an output from AND gate 17. Since AND gates 17 and 42 are controlled by the outputs of flip-flop 15, it can be seen that only one of these AND gates can produce an output at any one time.

The M output of flip-flop 45 is supplied as an input to AND gate 46, with this AND gate receiving a second input consisting of the signal at signal source 18 as inverted by pulse inverter 47. The $\overline{M}$ output of flip-flop 45 goes nowhere.

In describing the operation of this apparatus, assume that the signals from the antenna are supplied only to receiver 29 and that this receiver presently is not producing either an audio output signal or an AGC signal at the predetermined level set in threshold 41. Threshold 41, accordingly, produces no output signal and the absence of an input to pulse inverter 43 causes an output pulse to be present on the "enable" line 44. This "enable" pulse permits clock 14 to function, and flip-flop 15 changes state at a rate dictated by the rate of operation of the clock.

Since the communications apparatus with which this invention presently is being used is in the receive mode, a signal is present at signal source 18 and this signal is applied to AND gate 16 along with a signal from flip-flop 15 each time that this flip-flop assumes the F state. The concurrent presence at AND gate 16 of these two inputs causes the AND gate to produce an output pulse delivered to OR gate 19, and this OR gate responds to produce an output pulse received by relay driver 20. Relay driver 20 causes relay 21 to be actuated to move switch element 25 out of contact with terminal 27 and into contact with terminal 26, thus switching receiver 29 from antenna B to antenna A.

If antenna A causes receiver 29 to produce an output signal either at audio output 30 or at AGC output 31 which exceeds the threshold level, then the output from threshold 41 is inverted at 43 to cause the absence of an output pulse on "enable" line 44. This causes clock 14 to cease operating and flip-flop 15, no longer receiving clock pulses, remains in the F state. The continued presence at AND gate 16 of the F input and the input from source 18 causes relay 21 to retain switch element 25 in the antenna A position.

However, if the output signal from receiver 29 resulting from the application of the input from antenna A was below the threshold level, then flip-flop 15 changes states under the direction of clock 14 to the $\overline{F}$ state and AND gate 16 thus loses one of the inputs thereto and no longer produces an output to OR gate 19. The positive signal still is present at source 18, however, and this signal causes pulse inverter 47 to produce no output signal, thus ensuring that AND gate 46 also produces no output signal. Since neither of the inputs to OR gate 19 now contains a signal, relay 21 is de-energized and switch element 25 reverts to terminal 27 to reapply antenna B to the receiver. Switch element 25 continues to alternate between terminals 26 and 27 until such time as the operation of flip-flop 15 is suspended in response to the presence of a signal exceeding threshold level.

If the apparatus of this invention is used in conjunction with communications equipment employing a transmitter and it is desired to use the transmitter with the antenna, if any, producing an acceptable receiver signal, then the apparatus described above ensures that this happens. For example, assume that the last received signal exceeding threshold level was produced by antenna B. This means that flip-flop 15 presently is holding in the $\overline{F}$ state and that OR gate 19 is receiving no signal on either of the inputs thereto. The $\overline{F}$ output from flip-flop 15 is supplied to AND gate 17, and the presence of an output from threshold 41 also is applied to AND gate 17 to cause flip-flop 45 to assume the $\overline{M}$ state. As mentioned earlier, AND gate 42 is inoperative at this time because of the absence of the F input thereto. When the communications equipment is switched from receive to transmit, the signal previously present at source 18 vanishes, causing pulse inverter 47 to produce an output pulse in response to the absence of an input pulse. While this output pulse is applied to AND gate 46, the other input to this AND gate presently receives no pulse because flip-flop 45 is in the $\overline{M}$ state. Thus, OR gate 19 continues to receive no input signal and switch element 25 remains connected to terminal 27 during the transmit operation. At the end of the transmit operation, a signal again is present at source 18 and the apparatus of this invention reverts to the operational state described above to function in response to the presence or absence of receiver output exceeding threshold level.

Assuming, however, that the last receiver signal exceeding threshold level was from antenna A, then the flip-flop 15 would be in the F state at the time transmission was commenced. AND gate 42 would be receiving an input both from flip-flop 15 and from threshold 41 so that flip-flop 45 would be in the M state. AND gate 46 thus would be receiving inputs both from flip-flop 45 and from inverter 47 when the transmit operation commenced, and so AND gate 46 would supply an output to OR gate 19 replacing the now-lapsed output from AND gate 16 and causing relay 21 to remain energized to keep switch element 25 in contact with terminal 26. Since the loss of a previously acquired signal above threshold level results in the absence of output from threshold 41, memory flip-flop 45 remains set in the state corresponding to the antenna last producing a signal above threshold and is not disturbed by the operation of flip-flop 15. Although flip-flop 15 operates continuously during the transmit operation because of the absence of receiver output at that time, the absence of a signal from source 18 applied to AND gate 16 prevents antenna switching from occurring during the transmit operation.

The apparatus of this invention is not limited to use only with a receiver of the Tacan type and may be used with one or a plurality of other receivers 33 which may, for example, be conventional communication receivers. In such case, it may be preferable to supply the AGC outputs only of each of such other receivers to OR gate 35.

Since the apparatus disclosed above consists of logic elements which, except for relay 25, are readily available or constructable in solid state form, this apparatus is capable of the high degree of reliability demanded of equipment intended for airborne use.

It should be understood, of course, that the foregoing relates to only a preferred embodiment of the invention and that numerous modifications or alterations may be made therein without departing from the spirit and the scope of the invention as set forth in the appended claims.

What is claimed is:

1. The method of selecting an antenna from a plurality of available antennas for producing a dependably useable signal at a receiver to which the selected antenna is connected, comprising the steps of:

obtaining from the receiver a first signal indicative of a first parameter of the received signal;

obtaining from the receiver a second signal indicative of a second parameter of the received signal; and utilizing the one of said first and second signals having the greater magnitude to determine selection of the antenna desired to be connected to the receiver.

2. The method as in claim 1, wherein said first signal is indicative of the amplitude of the carrier wave of the received signal and said second signal is indicative of the amplitude of a modulation signal impressed on said carrier wave.

3. The method as in claim 1, further comprising the steps of:

alternately connecting the available antennas in sequence to the receiver so long as neither of said first and second signals exceeds a predetermined threshold level;

retaining the connection between the receiver and an antenna which causes at least one of said first and second signals to exceed said predetermined threshold level; and resuming said step of alternately connecting the available antenna in sequence when neither of said first and second signals exceeds said predetermined threshold level.

4. Antenna selecting apparatus for selecting and connecting to communication apparatus an antenna producing at least a minimum signal level, comprising:

selecting means controllable to switch sequentially between a common terminal thereof and a selected one of a plurality of other terminals, each of said other terminals being connectable to a separate antenna means;

circuit means connecting said common terminal of said selecting means to the antenna input of at least one receiver;

threshold means connected to be responsive to a plurality of receiver-derived signals and to produce an output signal which is a function of the receiver-derived signal having the greatest magnitude;

first multistate means capable of assuming only one of a plurality of states at a time, said first multistate means being operatively associated with said selecting means to control said switching function in response to the state of said multistate means;

said threshold means being controllingly associated with said first multistate means to enable said first multistate means to cause said sequential switching operation of said selecting means in the absence at said threshold means of a receiver-derived signal of at least a certain threshold level and to prevent said first multistate means from causing said sequential switching operation in the presence of a receiver-derived signal of at least said threshold level, so that the state maintained by said first multistate means in the presence of said signal at least of threshold level determines the one of said plurality of other terminals selected by said selecting means;

second multistate means capable of assuming only one of a plurality of states at a time and connected to be responsive to the states assumed by said first multistate means and to be responsive to the output of said threshold means so that said second multistate means assumes a particular state indicative of a corresponding certain switching position of said selecting means only upon the concurrent occurrence of a signal from said first multistate means corresponding to said certain switching position and a signal from said threshold means indicative of a receiver-derived signal of at least said threshold level;

so that the particular state assumed by said second multistate means corresponds to the switching position which produced the last threshold means output indicative of a receiver-derived signal of at least said threshold level; and second circuit means connected to be responsive to the particular state assumed by said second multistate means and to be responsive to an input signal indicating operation of a transmitter intended to be used with a selected antenna, said second circuit means having an output operatively connected to said selecting means;

said second circuit means functioning in response to an input signal indicating transmitter operation to control said selecting means to select the switching position corresponding to the particular state of said second multistate means so that the transmitter is connected to the antenna last producing a threshold means output indicative of a receiver-derived signal of at least said threshold level.

5. Apparatus as in claim 4, wherein said selecting means includes a switch means capable of selecting either of two antennas connected thereto, and said second circuit means comprises:

first AND means having two inputs and an output;

a first input thereof receiving a signal only when said second multistate means is in a certain state and a second input thereof receiving a signal only when the transmitter intended to be used with a selected antenna is operative;

said output of said first AND means having a signal only in response to the concurrent presence of signals on said inputs and being connected to cause said switch means to be actuated to a first switching state.

6. Apparatus as in claim 5, further comprising:

second AND means having two inputs and an output;

a first input thereof receiving a signal only when said first multistate means is in a certain state corresponding to the desired actuation of said switch means to said first state and a second input thereof receiving a signal only when the transmitter intended to be used with a selected antenna is inoperative;

said output of said second AND means having a signal only in response to the concurrent presence of signals on said inputs thereof;

OR means having two inputs and an output;

a first input thereof receiving said output of said first AND means and a second input thereof receiving said output of said second AND means;

said output of said OR means having a signal in response to the presence of a signal on at least one of said inputs thereof and being connected to cause said switch means to be actuated to said first switching state.

7. Antenna selecting apparatus of the type causing selection and connection to communication apparatus of an antenna producing at least a minimum signal level, comprising:

selecting means capable of being controlled to switch between a common terminal thereof and a selected one of a plurality of other terminals thereof, each of said other terminals being connectable to a separate antenna means;

controlling means operatively associated with said selecting means for causing said selecting means to switch between said common terminal and each of said other terminals;

circuit means connecting said common terminal of said selecting means to the antenna input of at least one receiver; and threshold means connected to be responsive to a first receiver-derived signal indicative of a first parameter of the received signal and to a second receiver-derived signal indicative of a second parameter of the received signal to produce an output signal which is a function of the receiver-derived signal having the greatest magnitude;

said threshold means being operatively associated with said controlling means to enable said controlling means to cause said sequential switching operation of said selecting means in the absence at said threshold means of one of said first and second receiver-derived signals of at least a certain threshold level and to prevent said controlling means from causing said sequential switching operation of said selecting means in the presence of one of said first and second receiver-derived signals of at least said threshold level.

8. Apparatus as in claim 7, wherein said threshold means is connected to be responsive to said first receiver-derived signal indicative of the amplitude of the carrier wave of the received signal and is connected to be responsive to said second receiver-derived signal indicative of the amplitude of a modulation signal impressed on said carrier wave.

References Cited

UNITED STATES PATENTS

| | | | |
|---|---|---|---|
| 2,685,643 | 8/1954 | Fisk et al. | 325—304 |
| 2,937,268 | 5/1960 | Downie et al. | 325—15 |
| 3,037,113 | 5/1962 | Bier | 325—370 |

KATHLEEN H. CLAFFY, Primary Examiner

CHARLES JIRAUCH, Assistant Examiner

U.S. Cl. X.R.

325—56, 302